INVENTORS
JOSEPH S. HAWKES
HENRY W. KROHN
WILLIAM C. RUDWELL
ATTORNEY

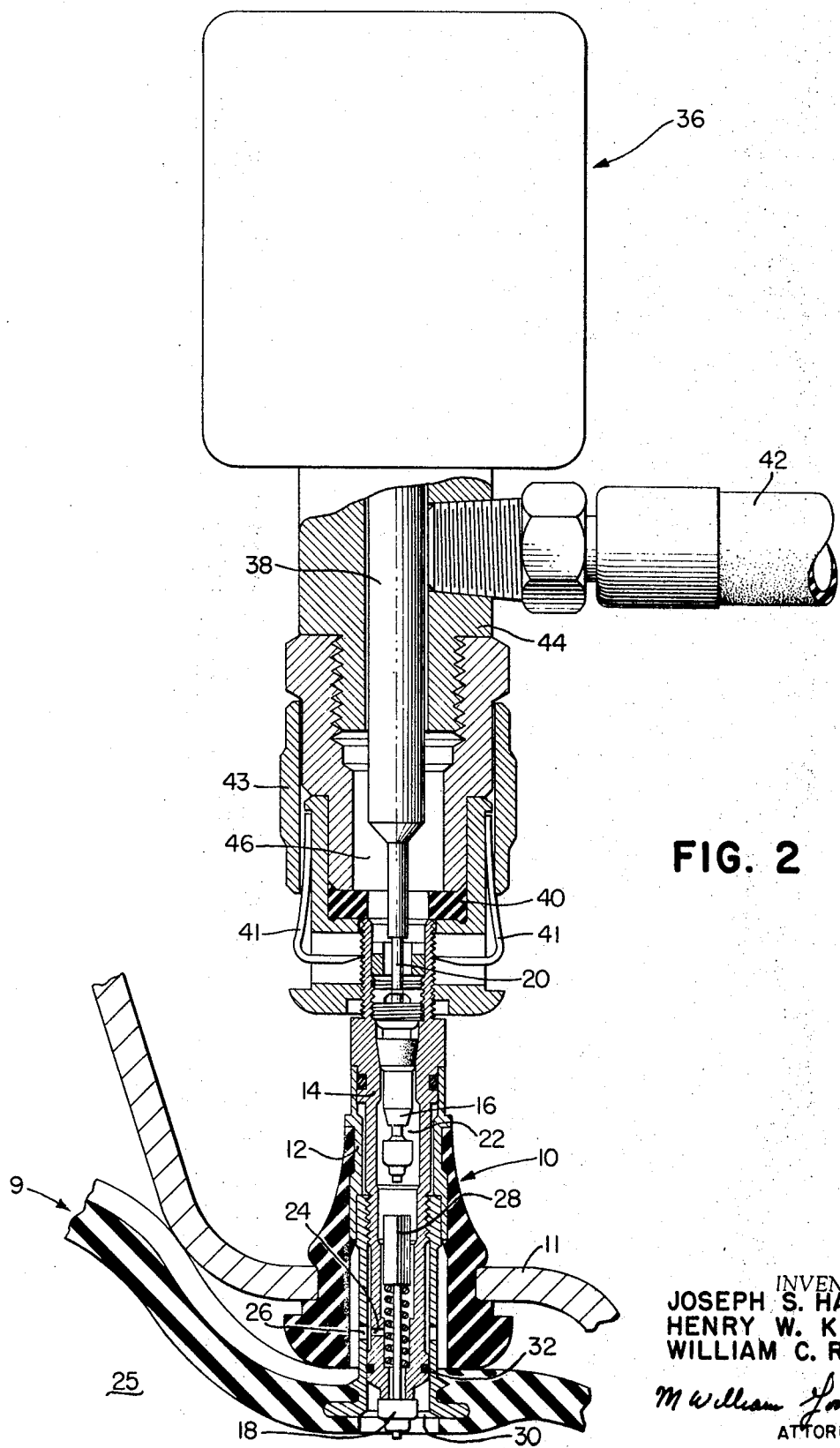

United States Patent Office 3,517,710
Patented June 30, 1970

3,517,710
AUTOMATIC INFLATING AND PRESSURE CHECKING MEANS FOR DUAL CHAMBER TIRES
Joseph S. Hawkes, Cuyahoga Falls, Henry W. Krohn, North Olmsted, and William C. Rudwell, Tallmadge, Ohio, assignors to The Goodyear Tire & Rubber Company, Akron, Ohio, a corporation of Ohio
Filed Apr. 2, 1968, Ser. No. 718,058
Int. Cl. B65b 1/30
U.S. Cl. 141—95                                    5 Claims

ABSTRACT OF THE DISCLOSURE

A system for automatically inflating the two chambers of a dual chamber tire having means for providing pressurized air to at least the inner chamber of the tire for a predetermined time interval and then for applying pressurized air only to the outer chamber of the tire for a predetermined time interval, subsequent to which the tire is automatically disconnected from the pressurized air source and automatically connected to means for indicating the pressure in the outer chamber of the tire and/or indicating deviation of the outer chamber pressure from a predetermined value or range.

---

Figure 1:
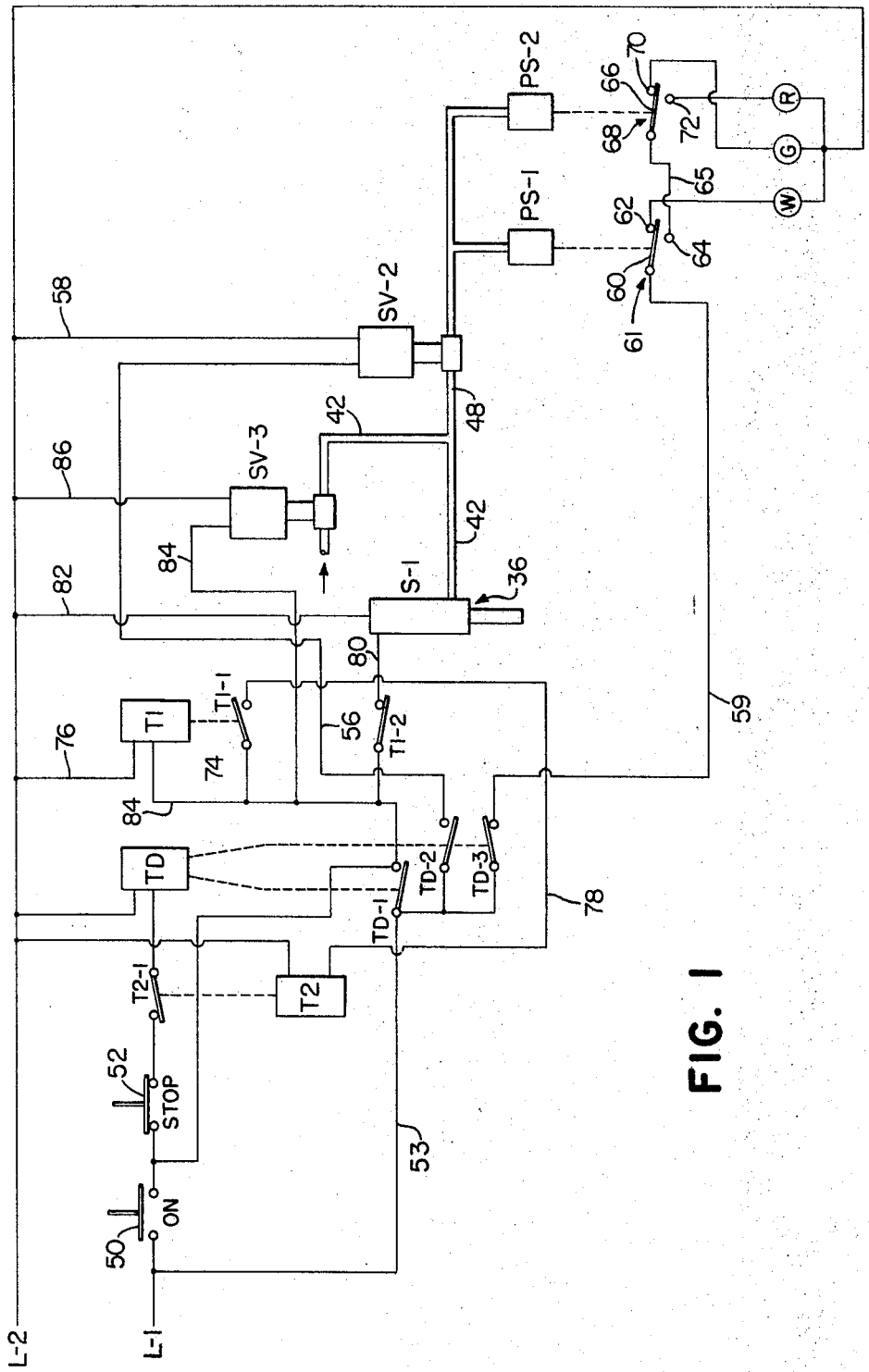

The foregoing abstract is not to be taken as limiting the invention of this application, and in order to understand the full nature and extent of the technical disclosure of this application, reference must be made to the accompanying drawings and the following detailed description.

This invention relates to dual chamber tires, and more particularly to a novel and improved system for providing automatic inflation of the chambers of the tire to predetermined different pressures.

With dual chamber pneumatic tires, such as for example but not limited to, a tire as shown in U.S. Pat. No. 3,361,153, it is desirable to inflate the inner chamber of the tire to a pressure substantially greater than that of the outer chamber of the tire. Heretofore this has been accomplished in a variety of ways including special valve means for inflating both chambers simultaneously but at different rates to assure a higher pressure in the inner chamber, inflating the two chambers separately and checking the pressure of each manually, etc. However, prior methods of inflating such tires have required several steps on the part of personnel performing the operation and often require the use of special tools and gauges during the inflating operation to assure that the pressures are at the right levels.

It is the object of the present invention to provide a novel and improved automatic system for inflating the inner and outer chambers of a tire to predetermined pressures and for providing an indication of the pressure reached at least in the outer chamber of the tire.

Other objects will be in part obvious, and in part pointed out more in detail hereinafter.

In the drawings:

FIG. 1 is a generally schematic representation of an automatic tire inflation system incorporating the present invention; and FIG. 2 is an elevational view partly in section of a portion of the system of FIG. 1.

With reference to FIG. 2 of the drawings, there is shown an exemplary dual chamber tire having a dual valve assembly generally indicated at 10 with the tire being mounted on a rim 11. The valve assembly 10 comprises a valve stem 12 within which is received a housing 14. The housing 14 in turn receives a pair of axially aligned valves 16 and 18. The outer valve is provided with a pin 20 which when moved inwardly of the valve will permit passage of air through the valve into the chamber 22 interiorly of the housing 14. The chamber 22 is adapted to communicate with the external chamber of the two chamber tire through opening 24 in the housing 14 and an opening 26 in the valve stem 12. The inner valve 16 is provided with a pin 28 which when moved inwardly of the valve provides communication between the chamber 22 and the inner chamber 25 of the tire through an outlet port generally indicated at 30 in the valve means. The pin 20 of the outer valve 16 will open the outer valve in response to movement of the pin inwardly of the valve. The pin 20 is permitted movement in excess of that required merely to open the valve 16 so as to permit engagement of the pin 20 with the pin 28 of the inner valve 18, whereupon continued inward movement of the pin 20 will effect inward movement of the pin 28 thus to open the inner valve 18. A seal 32 adjacent the end of the stem 12 associated with the outlet opening 30 assures that unless the inner valve 16 is opened there will be no communication between the chamber 22 and the outlet port 30 of the valve means.

With continued reference to FIG. 2, the system of this invention includes a chuck or actuating means 36 comprising an elongated plunger or actuating member 38 which is displaceable longitudinally of itself in response to actuation of a solenoid S-1. More particularly, the chuck 36 is engageable over the valve 10 with the outer end of the valve in sealing engagement with a seal 40 in the chuck. With the solenoid S-1 de-energized the outer end of the plunger 38 will engage the actuating member or pin 20 in the valve and displace it inwardly of the valve so as to open the valve 16 to permit air to be introduced into the outer chamber of the tire. When the solenoid S-1 is energized, the plunger 38 will be extended so as to extend the pin 20 to displace the pin 28 and open the inner valve 16 to permit air to flow into the inner chamber of the tire. A first conduit 42 is connected to the chuck body 44, whereby pressurized air may flow into the chuck body into a space between the chuck body and the outer surface of the plunger 38. The pressurized air may then flow into an internal chamber 46 within the chuck body and thence into the outer end of the valve means 10.

With reference to FIG. 1, the conduit 42 is connected between the chuck 36 and the outlet of a solenoid valve SV-3, the inlet of which is adapted to be connected to a source of pressurized air. The solenoid valve SV-3 is normally closed to prevent the flow of pressurized air into the conduit 42 and thus to the chuck 36. A branch passage or a conduit 48 is connected to the conduit 42 intermediate the solenoid valve SV-3 and chuck 36. A normally open solenoid valve SV-2 has its inlet and outlet connected in series in the conduit 48. The conduit 48 is deadended downstream of the solenoid valve SV-2. A pair of pressure switches PS-1 and PS-2 are connected to the conduit 48 downstream of the solenoid valve SV-2, so that the solenoid valve SV-2 may serve to isolate the pressure switches from the conduit 42, as will be more fully hereinafter described.

With continued reference to FIG. 1, the various pneumatic portions of the system are associated with an electrical control portion which will now be described. Connected in series between the power lines L-1, L-2 are a normally open momentary closure "on" switch 50, a normally closed momentary release switch 52, the normally closed contacts T2–1 of a timer T2 and a relay TD. The relay TD has a pair of normally open contacts TD–1 which are closed in response to energizing of the relay TD. The contacts TD–1 are connected across the "on" switch 50 so as to act as holding contacts for the circuit. The relay TD also includes a pair of normally open contacts TD-2 and a pair of normally closed contacts TD-3. The contacts TD-2 and TD-3 are closed and opened, respectively, in response to energizing of the relay TD. However, on de-energizing of the relay TD there is a predetermined time delay before the contacts TD-2 and TD-3 open and close, respectively. In the specific embodiment shown, this time delay is approximately two seconds. One side of the contacts TD-2 and TD-3 are connected by line 54 to line 53 which connects one side of the contacts TD-1 to line L-1. The contacts TD-2 are connected in series with the solenoid valve SV-2 by line 56, and solenoid valve SV-2 is connected to line L-2 by line 58. The contacts TD-3 are connected in series with the movable contact 60 of a single pole double-throw switch 61 of the pressure switch PS-1 via line 59. When the pressure acting on the switch PS-1 is below a certain value, the movable contact 60 will be engaged with the contact 62 which is connected in series through a white indicator lamp W to the line L-2. When the pressure acting on the switch PS-1 exceeds a predetermined value, the movable contact 60 will be moved into engagement with the contact 64 which is connected by line 65 to the movable contact 66 of a single pole double-throw switch 68 of the pressure switch PS-2. When the pressure in the conduit 48 acting on the switch PS-2 is below a certain value, the movable contact 66 will be in engagement with the contact 70, which is connected in series through a green indicator light G to the line L-2. When the pressure in the conduit 48 exceeds a predetermined value, the contact 66 will be moved into engagement with the contact 72, which is connected in series through a red light R with the line L-2.

Returning now to the relay TD, the contacts TD-1 thereof are connected in series with a timer T1 by line 74, with the timer being connected to line L-2 by line 76. The timer T1 includes a pair of normally open contacts T1-1 and a pair of normally closed contacts T1-2. The contacts T1-1 and T1-2 thereof are connected in parallel with each other and are connected in series with the contacts TD-1 by line 84, line 84 also connecting the contacts TD-1 in series with the solenoid valve SV-3, which in turn is connected to line L-2 by line 86. The normally open contacts T1-1 are further connected in series with the timer T2 by line 78. The normally closed contacts T1-2 are further connected in series by line 80 with the solenoid S-1. The solenoid S-1 is in turn connected to line L-2 by line 82.

In the operation of the system just described, the chuck 36 is initially engaged with the dual valve means 10 so that the plunger 38 of the chuck will depress the pin 20 so as to condition the valve 10 for admission of pressurized air into the outer chamber of a tire associated with the valve. Spring means 41 on the chuck are engageable with the valve housing 14 to maintain the chuck in engagement with the valve, a sleeve 43 on the chuck serving to maintain the spring means 41 in engagement with the valve with retraction of the sleeve 43 being permitted to permit the spring means 41 to retract when it is desired to remove the chuck from the valve.

After the chuck has been engaged with the valve 10 the momentary closure "on" switch 50 is moved inwardly to energize the relay TD, which will be maintained energized by the contacts TD-1 after the "on" switch 50 has been released. In response to energizing of the relay TD the timer T1 is energized to initiate a first time cycle by this timer. The timer T1 is adjustable for the reason hereinafter described so as to vary the length of the time cycle thereof. The contacts T1-1 and T1-2 are not actuated until the end of the time cycle set by the timer T1. Accordingly, simultaneously with the closing of the contacts TD-1 the solenoid S-1 will be energized through the contacts T1-2 to extend the plunger 38 so as to displace the pin 20 of the valve 10 to condition the valve 10 for the admission of pressurized air into the inner chamber as well as the outer chamber of a tire associated with the valve. Also simultaneously with closing of the contacts TD-1 the solenoid valve SV-3 will be energized to open the valve and admit pressurized air into the conduit 42.

Simultaneously with energizing of the relay TD the contacts TD-2 thereof will be closed so as to energize the solenoid SV-2 to close the valve and isolate the pressure switches PS-1 and PS-2 from the main pressure conduit 42. Also, at the same time the normally closed contacts TD-3 will be opened so as to disconnect the series connected single pole double-throw switches 61 and 68 from line L-1.

Accordingly, it will be apparent that upon initiation of the cycle the system is conditioned to provide pressurized air at least to the inner chamber of the tire associated therewith. The pressurized air supply to the conduit 42 is accurately controlled insofar as pressure is concerned. With this controlled air supply and for a given tire, it will be possible empirically to provide a first time interval over which pressurized air is introduced into the inner chamber of the tire, so as to provide a predetermined pressure at the end of said first time interval. Therefore, the timer T1 is set to such a first predetermined time interval and at the expiration of this time interval the contacts T1-2 are opened to de-energize solenoid SC-1 and thus effect retraction of the plunger 38 so as to isolate the inner chamber of the tire from the pressure line 42. At this time, however, pressurized air will continue to flow into the outer chamber of the tire. Also, upon expiration of said first predetermined time cycle the contacts T1-1 are closed to energize the timer T2. As in the case of the timer T1, the timer T2 is adjustable to permit setting a second predetermined time interval thereon. This second predetermined time interval is also determined empirically, so that after the expiration thereof the outer chamber of the tire associated will have reached a predetermined pressure.

At the end of the second time interval set by the timer T2 the contacts T2-1 are opened so as to de-energize relay TD causing contacts TD-1 to be opened. The opening of contacts TD-1 will effect de-energizing of the valve SV-3 to effect closing of the valve and disconnect the conduit 42 from the source of pressurized air. After the predetermined time delay, previously mentioned, which permits the pressure in the tire and conduit 42 to stabilize, the contacts TD-2 will be opened to de-energize the solenoid valve SV-2 and connect the conduit 48 with the main conduit 42 leading to the chuck 36. At the same time the contacts TD-3 will be closed to connect switches 61, 68 of the pressure switches PS-1, PS-2 with the power line L-1.

The pressure switches PS-1 and PS-2 are adjustable and are set to provide an indication whether or not the pressure within the outer chamber of the tire is within a specified range. For example, the switch PS-1 might be set to be actuated in response to a pressure of 26 p.s.i. while the switch PS-2 might be set to be actuated in response to a pressure of 28 p.s.i. It will thus be apparent that if the pressure in the outer chamber of the tire, and thus in the line 48, is below 26 pounds, the movable contact 60 will remain stationary and accordingly the white light W will be energized to indicate a pressure below the specified range. On the other hand, if the pressure in the conduit 48, and thus in the outer chamber of the tire, is between 26 and 28 pounds, the switch PS-1 will be actuated to move the contact 60 into engagement with the contact 64, and thus cause energizing of the green light G to indicate that the proper range of pressure is present. On the other hand, if the pressure exceeds 28 pounds, both pressure switches PS-1 and PS-2 will be actuated to move the contacts 60 and 66 and thus effect energizing of the red light R, indicating an over-pressure in the outer chamber.

It might here be mentioned that during the pressurizing of the inner chamber of the tire associated with a valve 10 the outer chamber of the tire will also be connected to the source of pressurized air. Subsequent to isolating of the inner chamber from the source of pressurized air, the pressurized air will continue to flow into the outer chamber for a predetermined interval as described. It has been found that in a measurement of the pressure in the outer chamber of the tire will at the end of such a cycle provide a sufficiently accurate indication of the inner chamber pressure. In other words, if the outer chamber pressure is within specified limits, then the inner chamber will also be within desired limits.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

Having described our invention, we claim:

1. A system for inflating a two chamber pneumatic tire of the type having a valve assembly with means for selectively introducing air into the two chambers of the tire including an actuating member which is displaceable from a first position corresponding to the introduction of air into one of said chambers and a second position corresponding to introduction of air at least into the other of said chambers, comprising chuck means engageable with said valve assembly and having actuating means operable to displace said actuating member from said first position to said second position, said chuck means including an air passage for introducing pressurized air into one of said chambers when said actuating member is in said first position and into at least said other of said chambers when said actuating member is in said second position, valve means connected to said actuating means for connecting and disconnecting said chuck means from a source of pressurized air and control means for actuating said valve means to connect said chuck means to said source and including timer means to condition said actuating means to displace said actuating member to said second position and maintain said actuating member in said second position for a first predetermined time interval and at the end of said first interval to condition said actuating means to effect displacement of said actuating member into said first position, said control means including second timer means energized by the first timer means at the end of said first interval and operative to effect actuation of said valve means at the end of a second predetermined time interval to disconnect said chuck means from said source.

2. A system for inflating a two chamber pneumatic tire of the type having a valve assembly with means for selectively introducing air into the two chambers of the tire including an actuating member which is displaceable from a first position corresponding to the introduction of air into one of said chambers and a second position corresponding to introduction of air at least into the other of said chambers, comprising chuck means engageable with said valve assembly and having actuating means operable to displace said actuating member from said first position to said second position, said chuck means including an air passage for introducing pressurized air into one of said said chambers when said actuating member is in said first position and at least into said other of said chembers when said actuating member is in said second position, first valve means connected by first conduit means to said chuck means for connecting and disconnecting said first conduit means from a source of pressurized air, pressure indicating means connected by second conduit means to said first conduit means intermediate said chuck means and said first valve means, second valve means in said second conduit means for controlling communication of said pressure indicating means with said first conduit means, and control means including first and second timer means, said first timer means being operative to effect conditioning of said actuating means to displace said actuating member into said second position for a first predetermined time interval and to effect conditioning of said actuating means at the end of said first time interval to permit said actuating member to return to said first position, said first timer means including means to effect energizing of said second timer means at the end of said first time interval, switch means to effect actuation of said first valve means to connect said chuck means to said source of pressurized air and simultaneously to energize said first timer means, said second timer means being operative at the end of a second predetermined time interval to condition said switch means to effect actuation of said first valve means to disconnect said chuck means from said source and to effect actuation of said second valve means to connect said second conduit means to said first conduit means whereby said pressure indicating means is enabled to provide an indication of the air pressure in said one of said chambers of a tire.

3. In a system as described in claim 2, said switch means being operative to effect actuation of said second valve means a predetermined time interval after actuation of said first valve means to disconnect said chuck means from said course.

4. In a system as described in claim 2, said pressure indicating means including a pair of pressure responsive switches each responsive to a different pressure, and visual indicating means associated with and energizable by each of said pair of switches.

5. In a system as described in claim 2, both said first and second timer means being adjustable to permit selective variation of said first and second predetermined time intervals.

References Cited
UNITED STATES PATENTS 3,232,309   2/1966   Eichenaver _____ 137—624.18

HOUSTON S. BELL, Jr., Primary Examiner

U.S. Cl. X.R.

137—624.18; 141—293, 348